United States Patent [19]

DeVisser et al.

[11] 4,297,209
[45] Oct. 27, 1981

[54] HIGH SOLIDS FILTER

[75] Inventors: Richard B. DeVisser, Schoolcraft; John W. Rishel, Vicksburg; Joe A. Kuiper, Mattawan, all of Mich.

[73] Assignee: Dover Corporation, Portage, Mich.

[21] Appl. No.: 137,221

[22] Filed: Apr. 4, 1980

[51] Int. Cl.³ .......................................... B01D 29/40
[52] U.S. Cl. .................................. 210/107; 210/108; 210/411
[58] Field of Search ............... 210/107, 108, 111, 112, 210/413–415, 411, 412

[56] References Cited

U.S. PATENT DOCUMENTS

| | | | |
|---|---|---|---|
| 3,088,595 | 5/1963 | Robb | 210/436 X |
| 3,338,416 | 8/1967 | Barry | 210/297 |
| 3,363,771 | 8/1966 | Walters | 210/360 |
| 3,491,889 | 1/1970 | Walters | 210/411 |
| 3,784,016 | 1/1974 | Akiyama | 210/415 X |
| 3,847,817 | 11/1974 | Jarman | 210/297 |
| 3,957,639 | 5/1976 | Schoen | 210/107 |
| 4,085,050 | 4/1978 | Gervasi | 210/414 X |

Primary Examiner—John Adee
Attorney, Agent, or Firm—Blanchard, Flynn, Thiel, Boutell & Tanis

[57] ABSTRACT

A self-cleaning filter assembly for removing solids from an incoming liquid to be filtered. A filter element is fixed substantially coaxially within a housing and spaced from the peripheral wall thereof by an annular solids collection space in turn communicating with a solids outlet. An inlet introduces pressurized liquid to be filtered circumferentially into the solids collection space. A shower assembly rotates coaxially within the filter element and includes an eccentric portion having jets distributed along the length of the filter element and aimed outward close to the inner surface of the filter element. Backwash liquid enters the rotating shower assembly under pressure for continuously pushing solids off the outer surface of the filter element as the shower assembly circumferentially advances in the housing. Filtrate from inside the filter element passes through a filtrate outlet extending from the housing. A solids outlet valve responds to a preselected increase in liquid pressure differential between the inlet and filtrate outlet by opening to increase venting of the annular solids collection space. A filtrate outlet valve may simultaneously close to direct all liquid flow into the housing out the solids outlet.

24 Claims, 15 Drawing Figures

HIGH SOLIDS FILTER

FIELD OF THE INVENTION

This invention relates to a filter assembly for filtering of liquids under pressure and more particularly relates to a self-cleaning filter assembly for liquids containing high concentrations of solids.

BACKGROUND OF THE INVENTION

Filters have long been used industrially, particularly in liquid process industries, such as pulp and paper manufacturing operations, to remove solids from a process liquid by passing the liquid through a filter element through which solids above a preselected size cannot pass. Typically, the filter element is contained in a closed housing to which the process liquid to be filtered is supplied under pressure. It is well known that contaminants and other particulate matter removed from the liquid to be filtered will eventually build up on the filter surface. Such build up of solids, if unchecked, normally continues until liquid flow through the filter is insufficient or is substantially blocked. Thus, the filter element requires periodic cleaning to remove solids.

To effect such cleaning, it has been known to stop filtration, remove the filter element from the housing, hand or machine clean same, and then reassemble the apparatus prior to resuming the filtering operation. However, this procedure is costly in labor and filter unit downtime, and is virtually useless for liquids containing a high concentration of solids which quickly degrade or block filtration.

Several attempts have been made in the past to provide more practical filter cleaning measures.

In one, processed liquid flow through the filter is periodically stopped and for a brief time backwash liquid is passed in a reverse direction through the filter element to dislodge solids accumulated thereon. However, uniform application of backwashing liquid to the surface of the filter element has been a difficulty in the past. Also, this method requires periodic shutdown of the filter unit.

Such need for periodic shutdown of the filter has been overcome in the past by using an array of several filter units in parallel, with only one at a time shut down backwashing, such that the array is in partial operation at all times. However, several smaller filter units may be more costly than one large one and tend to require more space and installation effort.

Past attempts to equip single filter units for continuous filtration and self-cleaning have included applying a liquid to be filtered to the outside of a rotating cylindrical filter element and relying on centrifugal force to thaw particles outward off the drum. Attempts have been made to increase the cleaning effectiveness of this rotating filter element by addition of ancillary cleaning structures.

For example, Walters U.S. Pat. No. 3,353,771, directs incoming liquid in a small cross-section high velocity jet at the outside of the filter element to peel caked solids off the outside of the rotating filter element, has a special housing cross section, and has multiple liquid deflecting elements within and rotating with the filter element in an attempt to assist removal of solids cake from the outside of the rotating filter element.

As a further example, Jarman U.S. Pat. No. 3,847,817 directs incoming liquid to be filtered with special baffles to again attempt to peel solids cake off a rotating filter element, has a special fixed liquid wedging blade within the filter element to force filtrate reversely out through the filter element, and has an axially extending and angularly directed scraper member to peel solids off the filter element and into an axially extending solids receiver.

As a further example, Barry U.S. Pat. No. 3,338,416 horizontally rotates a filter element, introduces liquid to be filtered to the rotating filter element substantially along the entire axial length thereof by suitable baffling, has a fixed axial array of backwash jets within the filter element to direct backwash liquid radially outward through the filter element and a fixed axially extending slot in a closely adjacent partition in an attempt to knock solids off the rotating filter element into the slot.

Each of the last-mentioned three patents require relatively complex and expensive structure to rotatably mount and drive the cylindrical filter element and to support, either rotatably or fixedly, the described ancillary elements inside and outside of the rotating filter element. Moreover, care must be taken to avoid vibration and fatigue due to imbalance of the rotating filter element by uneven distribution of solids cake thereon.

Walters U.S. Pat. No. 3,491,889 attempts to achieve self-cleaning of the filter element without rotation of the filter element by rotating axially extending scooper plates near the interior surface of the filter element, the plates being angled from the filter element surface in an attempt to wedge filtrate radially outward through the filter element wall and against solids on the outer surface thereof. In testing of apparatus of this type, the present Assignee has encountered difficulty in maintaining continuous filtering. It was found that excessive horsepower and rotating speed was needed to generate sufficient energy to dislodge even the least tenacious types of particles from the filter element wall and the tested apparatus was found ineffective for dislodging sticky or fibrous particles from the filter element wall.

Accordingly, the objects of this invention include provision of:

1. A self-cleaning filter unit particularly adapted for filtering of liquids containing solids in relatively high concentration and/or containing solids particularly prone to sticking to or entangling with the filter element mesh in a manner to quickly load or blind the filter element.

2. An apparatus, as aforesaid, in which helical downward swirling of solids bearing liquid outside the filter element, assisted by gravity, increases the concentration of solids in a limited zone of the filter unit for continuous removal during filtering, but wherein if desired intermittent removal of concentrated solids can instead by selected.

3. An apparatus, as aforesaid, in which excessive build-up of solids material on the input side of the filter element is sensed and automatically causes an increased flow from the solids collection zone out of the filter element.

4. An apparatus, as aforesaid, of a relatively simple structure in which only the central element is rotatable and in which the filter element is fixed and does not require rotatable support structure.

Other objects and purposes of the invention will be apparent to persons acquainted with apparatus of this general type upon reading the following specification and inspecting the accompanying drawings.

The objects and purposes of the invention are met by providing a self-cleaning filter assembly for removing solids from an incoming liquid to be filtered wherein a filter element is fixed substantially coaxially within a housing and spaced from the peripheral wall thereof by an annular solids collection space in turn communicating with a solids outlet. An inlet introduces pressurized liquid to be filtered circumferentially into the solids collection space. A shower assembly rotates coaxially within the filter element and includes an eccentric portion having jets distributed along the length of the filter element and aimed outward close to the inner surface of the filter element. Backwash liquid enters the rotating shower assembly under pressure for continuously pushing solid off the outer surface of the filter element as the shower assembly circumferentially advances in the housing. Filtrate from inside the filter element passes through a filtrate outlet extending from the housing. A solids outlet valve responds to a preselected increase in liquid pressure differential between the inlet and filtrate outlet by opening to increase venting of the annular solids collection space. A filtrate outlet valve may simultaneously close to direct all liquid flow into the housing out the solids outlet.

DETAILED DESCRIPTION

Figure 1:
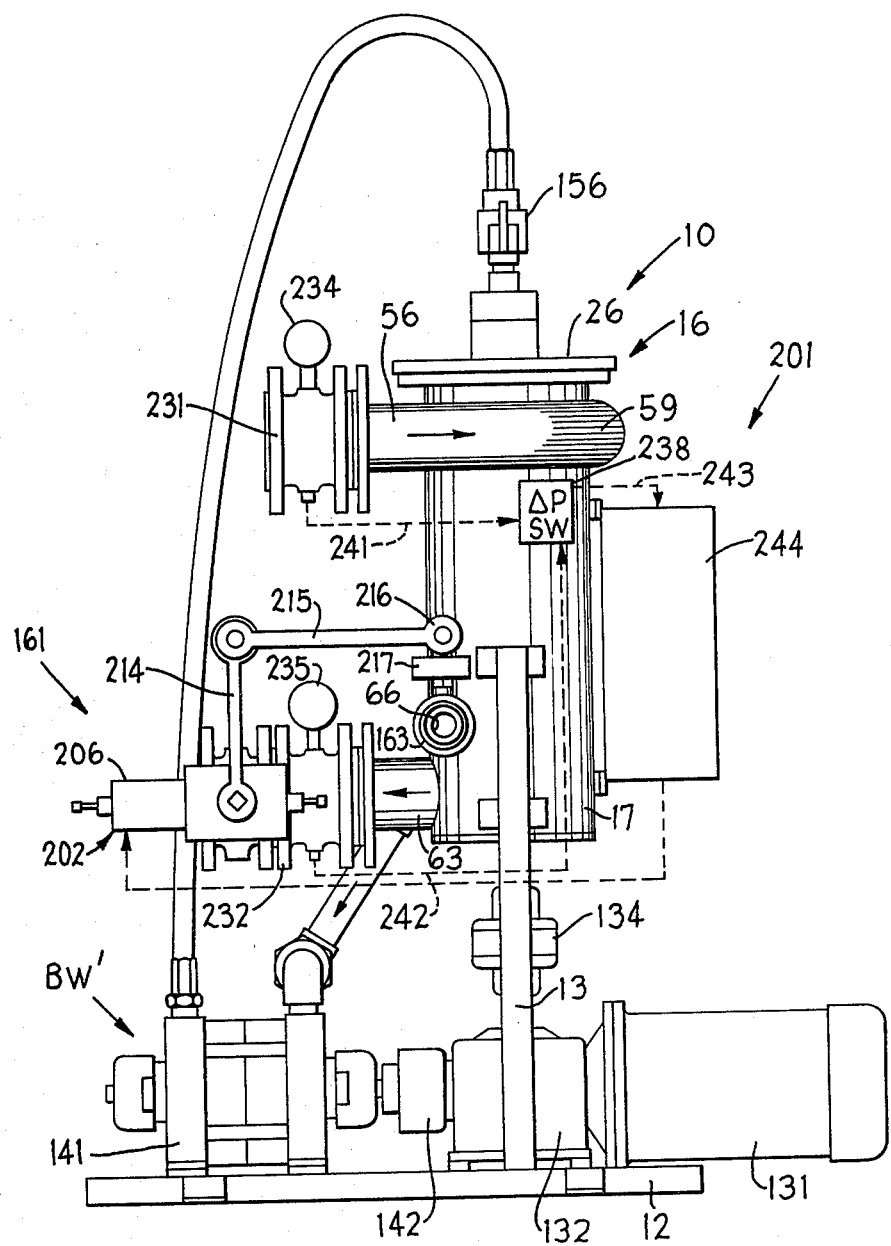
FIG. 1 is a front elevational view of a filter apparatus embodying the invention.

A filter apparatus 10 (FIGS. 1 and 2) includes a base 12 and upstanding legs 13 fixedly supporting the substantially cylindrical housing 17 of a filter unit 16 above the base 12.

Figure 4:
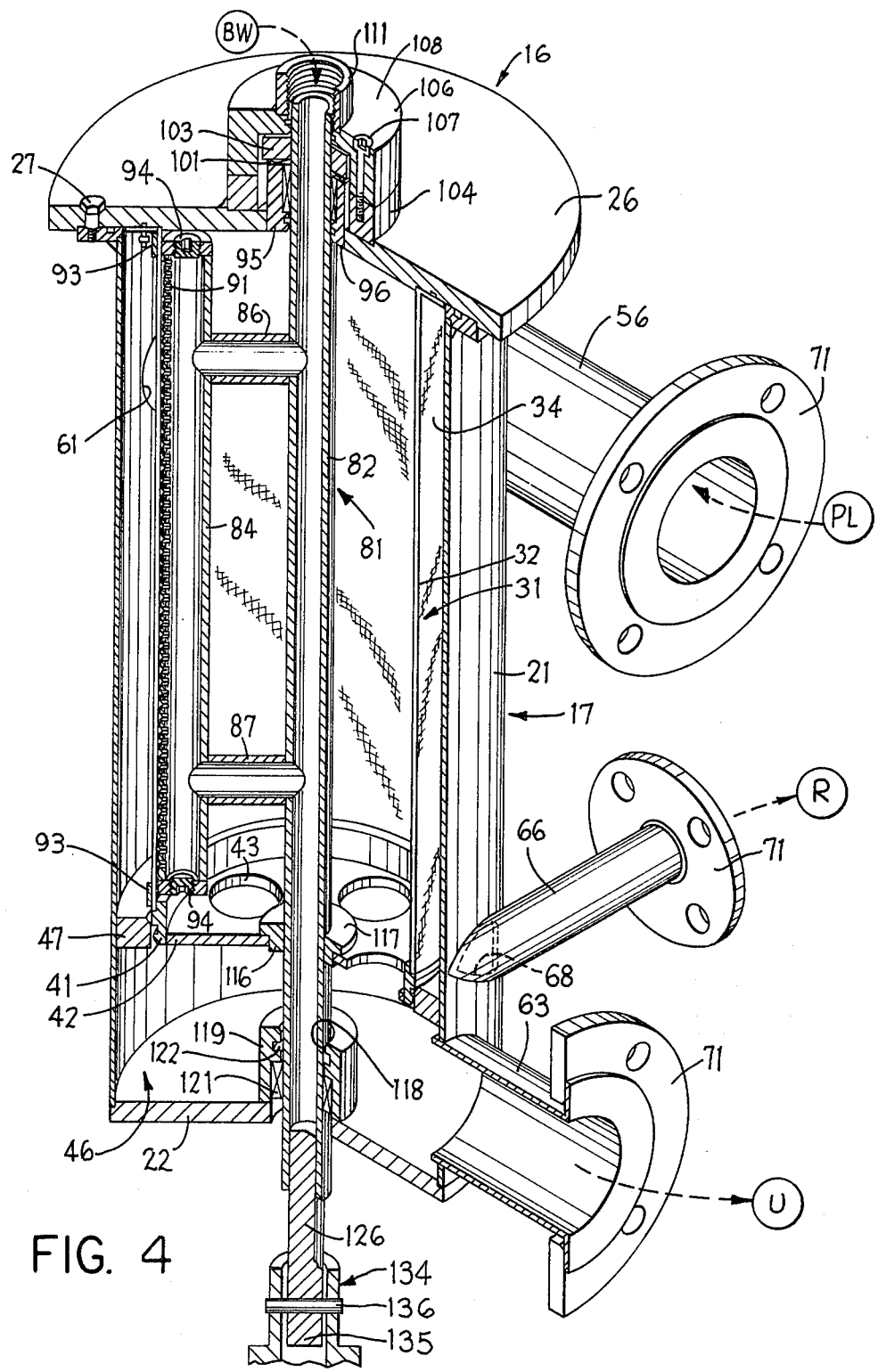
FIG. 4 is an enlarged pictorial view, partially broken, substantially on the cutting line IV—IV of FIG. 3.

The housing 17 includes a substantially cylindrical peripheral wall 21 (FIG. 4) having a fixed bottom end plate 22 and a radially outwardly extending annular mounting flange 23 fixed to the top edge thereof. A top end plate 26 is removably affixed, as by circumferentially distributed screws one of which is shown at 27, coaxially atop the flange 23 to close the upper end of the housing 17. An annular seal 28 (FIG. 5), such as an O-ring, is suitably interposed between the flange 23 and plate 26 to block leakage of liquid from the housing.

A substantially cylindrical filter element 31 is coaxially fixed within the housing 17. The peripheral wall 32 of the filter element is spaced radially inward from the peripheral wall 21 of the housing by an annular, axially extending solids collection space 34. The peripheral wall 32 of the filter element is the filtering surface, which may be of any conventional type, such as a one-piece self-supporting screen or a rigid perforate metal support surrounded by and supporting a flexible filtering screen or textile cover. A peripheral flange 36 fixed as by welding to the upper end of the peripheral wall 32 pendently supports the filter element from the top plate 26 by circumferentially distributed releasable fasteners 37, here nuts threaded on studs pendently fixed to the top plate 26. A seal ring, such as an O-ring 38, may be interposed for better sealing between the flange 36 and top plate 26, if desired.

Figure 7:
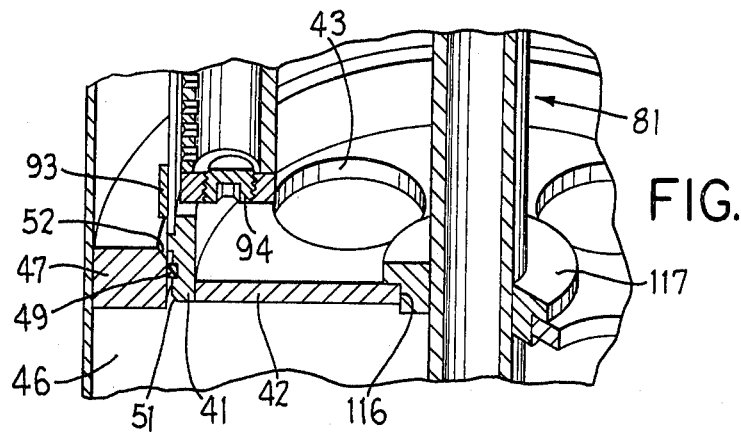
FIG. 7 is an enlarged fragment of FIG. 4 adjacent the lower end of the filter element.
Figure 8:
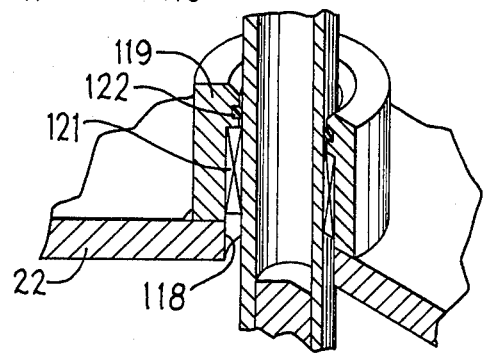
FIG. 8 is a fragment of FIG. 4 showing the bearing and seal construction adjacent the bottom of the housing.

The filter element 31 includes a bottom ring 41 (FIG. 7) fixed as by welding to the lower end of the peripheral wall 32 and fixedly supporting an end plate 42 provided with large holes 43 through which filtered liquid exits downward from the filter element into an outlet chamber 46 which axially spaces the bottom end plate 22 of the housing from the bottom end plate 42 of the filter element.

An annular intermediate wall 47 is fixed as by welding to the inner surface of the housing peripheral wall 21 in radially snug but axially slidable relation with the bottom ring 41 of the filter element for separating the solid collection space 34 from the outlet chamber 46. A seal, such as an O-ring 49, suitably interposed between the bottom ring 41 and annular wall 47 seals against fluid communication between space 34 and chamber 46.

The filter element 31 and top end plate 26 are thus removable as a unit from the housing 17. To facilitate installation of the top end plate-filter element unit, and more particularly to guide entry of bottom ring 41 into the annular wall 47, the ring 41 and inlet wall 47 have oppositely facing annular guide bevels 51 and 52.

An inlet pipe 56 (FIGS. 3 and 4) extends horizontally towards the housing 17 near the top end plate 26. An axial surface element 57 (FIG. 3) of the inner surface of the inlet pipe 56, namely the surface element 57 closest to the peripheral wall 21 of housing 17, would if extended be substantially tangent to the filter element peripheral wall 32, though if desired such extended surface element may lie further outward, namely between the peripheral walls of the housing 17 and filter element 31. The pipe 56 thus intersects the housing peripheral wall.

Figure 3:
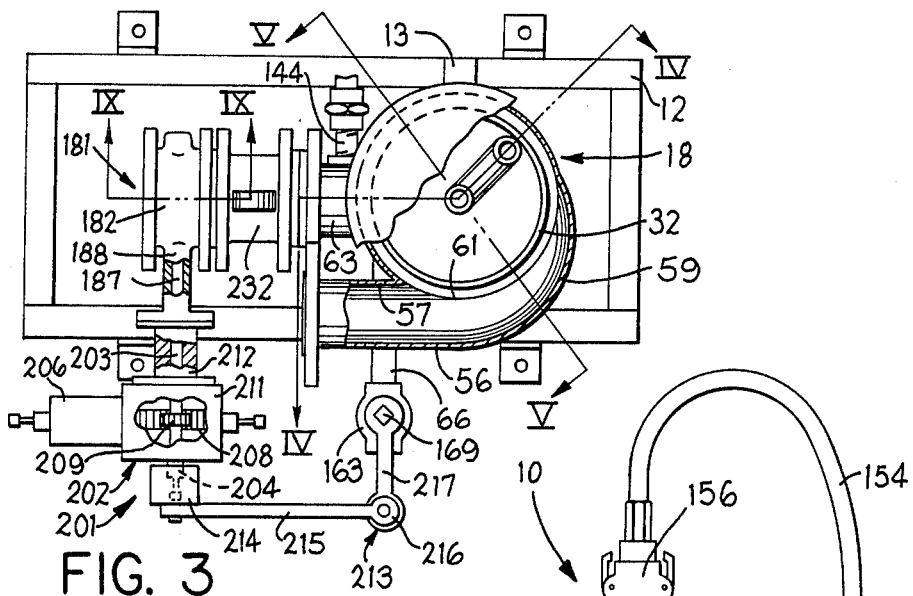
FIG. 3 is a top cross-sectional view substantially taken on the line III—III of FIG. 2.
Figure 5:
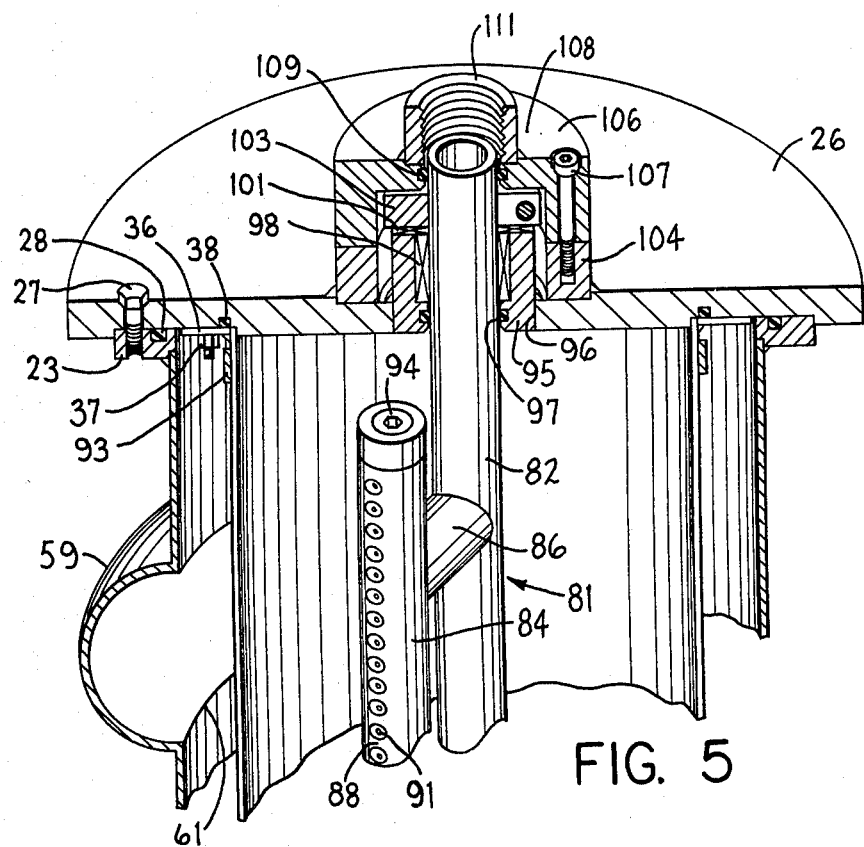
FIG. 5 is an enlarged fragmentary view of the upper portion of the FIG. 4 apparatus, but broken away substantially on the cutting line V—V of FIG. 3.
Figure 6:
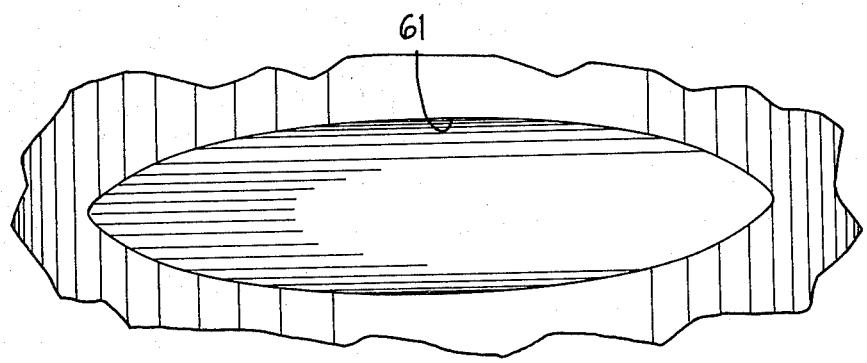
FIG. 6 is a view of the inlet opening through which the inlet scroll communicates with the interior of the housing, as seen looking outward from the filter element.

An extension 59 of an inlet pipe 56 extends beyond the intersection of pipe 56 and housing peripheral wall 21 and, as seen from the top in FIG. 3, spirals inward in merging relation with the housing peripheral wall over about a quarter of the circumference of the latter. The extension 59 opens into the solids collection space 34 through an oval opening 61 (FIGS. 3, 5 and 6) extending circumferentially of the housing peripheral wall 21 and bounded by the line of contact between the pipe extension 59 and housing peripheral wall 21. The extension 59 and peripheral wall 21 preferably are welded together along such line of contact in a leakproof fashion. However, it is also contemplated that the upper portion of the housing peripheral wall and extension 59 may be formed integrally as a single casting to which the pipe 56, top plate 26 and the lower portion of the housing peripheral wall 21 (below extension 59) suitably connect. The pipe 56 and extension 59 thus supply an inlet liquid stream substantially tangent to, rather than radially impinging on, the filter element peripheral wall 32 and impart to the liquid in the solids collection space 34 a circumferential swirling motion (counterclockwise as viewed in FIG. 3).

A filtrate outlet pipe 63 extends, here substantially radially, from the outlet chamber 46 out through the peripheral wall 21 of the housing.

A solids outlet pipe opens through the housing peripheral wall 21 near the bottom of the solids collection space 34 for receiving accumulated solids in liquid supension. Pipe 66 extends substantially tangtentially from the housing peripheral wall in a direction corresponding to the circumferential direction of the inlet flow through extension 59 (counterclockwise as seen from the top in FIG. 3). Thus, centrifugal force on the circumferentially swirling solids material in the space 34 tends to direct same tangentially out of the annular space 34 into the solids outlet pipe 66. Due to the net downward movement of liquid entering Through extension 59, passing downwardly along and through the filter element and thence down to the outlet chamber, solids stripped from the incoming liquid by the filter element, assisted by gravity, tend to fall down toward the bottom of the solids collection space 34 to provide the greatest concentration of solids at the bottom thereof, such tht the solids outlet pipe 66 tends to draw off the part of the liquid in the space 34 having highest solids concentration. The opening (indicated in broken lines at 68 in FIG. 4) through which pipe 66 communicates with space 34 corresponds in shape to the intersection of pipe 66 with housing peripheral wall 21 and is thus substantially oval.

In the preferred embodiment shown, the pipes 63 and 66, like extension 59, are fixed in a leakproof fashion to the housing peripheral wall, as by continuous seam welding. Each of the pipes 56, 63 and 66 has its end remote from the housing provided with suitable connecting means, here conventional pipe flanges 71 for respective connection to a source PL of process liquid to be filtered, a point of use U for the filtered liquid, and a waste or recovery location R for the concentrated solids suspension from pipe 66.

A rotating shower assembly 81 (FIG. 4) comprises a central pipe member 82 rotatably supported coaxially with the filter element 31. The shower assembly 81 further includes an eccentric portion, comprising an eccentrically located pipe member 84, rigidly supported by first and second substantially radially extending connecting pipe members 86 and 87 from the central pipe member 82 in liquid communication therewith. Eccentric pipe member 84 parallels the central pipe member 82 and has its radially outermost face 88 parallel to the filter element peripheral wall 32.

Plural jets 91 are closely distributed along the radially outer face 88 in an axial line. The jets 91 communicate with the interior of the eccentric pipe member 84. The jets 91 are aimed outward toward the filter element peripheral wall 32 and are close spaced thereto, for example 0.060 inch away. The jets preferably have an opening in the range of 0.018 to 0.040 inch, 0.024 inch being a typical jet diameter. The jets preferably have a spray pattern elongated axially of the filter element 31 so as to provide a substantially continuous line of spray throughout the effective axial length of the filter element.

Figure 5A:
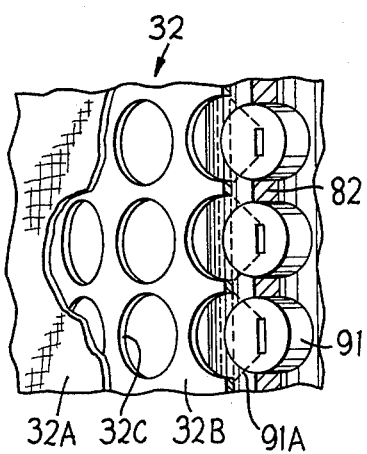
FIG. 5A is a substantially enlarged, partially broken fragment of the jet and adjacent filter element wall structure of FIGS. 4 and 5.

In the preferred embodiment shown in FIG. 5A, the filter element peripheral wall 32 incorporates as the actual filtering surface 32A a cloth bag or flexible screen secured around a rigid metal perforate backing shell 32B. The perforations 32C in the shell 32B are arranged in plural circumferential rows. Each jet 91 faces outward toward its own circumferential row of holes 32C such that each jet 91 moves into substantially coaxial alignment with successive holes 32C of its corresponding circumferential row as it orbits. The spray pattern 91A of each jet 91 preferably diverges, substantially in a vertical plane, so as to occupy substantially the full diameter of each hole 32C. This maximizes the amount of backwash spray from each jet passing through the successively presented holes 32C of the corresponding circumferential row to strike and clean the cloth bag surface 32A, thereby optimizing removal of particles outward off the bag surface 32A.

Conventional bank clamps 93 may be used to mount the ends of the cloth bag 32A on the ends of the shell 32B. The line of jets 91 extends substantially the distance between the band clamps 93.

Pipe plugs 94 are threaded in the ends of the eccentric pipe member 84 and are removable for cleaning the inner ends of the jets 91, in case of operation under extreme conditions, namely with minimum jet size and a backwash liquid containing some residual solids.

The eccentric pipe member 84 with its jets 91 orbits close to the peripheral wall 32 of the filter element as the central pipe member 82 rotates. The central pipe member 82 in the preferred embodiment shown is pendently supported for rotation by the top end plate 26 of the housing.

More particularly, the top plate 26 has a central bore 96. An inner sleeve 95 is coaxially fixed, as by welding, within the central bore 96. Sleeve 95 is annularly relieved for receiving a seal ring, such as an O-ring 97, and an overlying sleeve bearing 98 rotatably engaged by the upper end portion of the central pipe member 82, for liquid sealing and radial thrust support, respectively. The upper end of the inner sleeve 95 supports an axial thrust bearing 101, here of conventional roller type. An annular flange 103 surrounds the upper end of the central pipe member 82 and is fixed thereto in axially removable fashion as by circumferential clamping. More particularly, the annular flange 103 may comprise a conventional diametrally split collar, with opposed haves connected at their ends by chordally extending screws to tightly grip the central pipe member 82. Alternately, the flange 103 may be a conventional C-shaped collar having opposed ends squeezed together by a chordally extending screw to tightly grip the central pipe member 82. Thus, the flange 103 and bearing 101 coact to pendently support the rotating shower assembly. An outer sleeve 104 loosely coaxially surrounds the inner sleeve 97 and is fixed as by welding to the top plate 26. A cup member 106 is releasably fixed atop the outer sleeve 104 as by screws 107 and includes an upper end portion 108 overlying the annular flange 103 and provided with a seal, such as an O-ring 109, bearing against the upper end of the central pipe member 82 in sealing fashion. The end portion 108 here carries a fitting 111 secured as by welding thereto for connection thereto to a source of backwash liquid, schematically indicated at BW. If desired, the height of the cup member 106 can be increased and provided with a radially extending fitting and passage, instead of the axially extending fitting 111 shown, so as to permit radial rather than axial feeding of backwash liquid to the open upper end of the central pipe member 82. Also, if desired, a conventional rotary fluid joint can be substituted for sleeve 104, cup 106, and fitting 111.

The lower end of the central pipe member 82 extends downward through a cetral opening 116 in the filter element bottom end plate 42. The central opening 116 is preferably lined with a low friction (such as Teflon) guide ring 117 which assists in centrally locating the lower end of the central pipe member 82 with the shower assembly 81, filter element 31 and top plate 26 assembled together as a unit, prior to and during insertion of such unit into the housing 17. The guide ring 117 does not in the present embodiment serve as a seal or bearing during rotation of the shower assembly 81.

The lower end of the central pipe member 82 further extends downward through a central opening 118 in the bottom end plate 22 of housing 17. A sleeve 119 coaxially surrounds the central opening 118 and extends upward from the bottom plate 22. The sleeve 119 is annular relieved to carry a radial thrust bearing sleeve 121 surmounted by a suitable seal, such as an O-ring seal 122, which snugly surrounds the lower end of the central pipe member 82 and respectively engages same for radial bearing and sealing purposes. The sleeve 119 preferably extends upward into the chamber 46 so as to maintain the seal 122 and bearing 121 above any solid material which may gradually collect on the plate 22.

The upper end of an upstanding shaft 126 is fixed coaxially in the lower end of central pipe member 82 both to close the lower end of such central pipe member and to rotatably drive same.

Mounted on the base 12 is a motor 131 which rotatably drives a speed reducer transmission 132 beneath the housing 17. The transmission 132 has a positively driven, reduced speed, right angle drive shaft 133 (FIG. 2) extending coaxially upwardly toward the shower drive shaft 126 and connected thereto through a conventional rotational drive coupling 134. The coupling 134 is preferably of a flexible type permitting minor misalignment between shafts 126 and 133 and reducing transmission of vibration therethrough. The lower end of drive shaft 126 is normally received in the upper end of the coupling 134 and has a dimetral end slot 135 (FIG. 4) receiving a drive pin 136 extending diametrically through the upper end of the coupling 134. The pin 136 rotationally drives the shaft 126 from the coupling 135, acts as a shear pin to limit transmission of torque to the drive shaft 126 to avoid breakage of the shower assembly and filter element should rotation of the former become impeded for any reason, and freely permits the shower assembly 81, filter element 31 and top plate 26 to be removed as a unit upwardly out of the housing 17. The transmission 132 is a commercial unit selectable to provide the desired speed reduction ratio. In the preferred embodiment shown, the ratio is about 15 to 1, to drive the shower assembly 81 at about 115 RPM. Different shower assembly rotational speeds are contemplated, for example in the range of 10–200 RPM.

The backwash liquid source BW may be of any convenient type, for example a source of liquid different from the process liquid being filtered and applied to the shower assembly 81 at a pressure exceeding the inlet pressure of the liquid to be filtered.

However, in the particular embodiment shown, a different type of backwash supply BW' (FIGS. 1 and 2) is employed which recirculates a portion of the filtrate from outlet 63, under enhanced pressure, to the inlet fitting 111 of the shower assembly 81. The backwash supply BW' includes a conventional high pressure pump 141 mounted on the base 12 and here driven rotatably through a direct drive output member 142 of the transmission 132. The transmission 132 provides a positive direct drive coaxially from the motor 131 to the pump 141. In the particular embodiment shown, the motor 131 drives the pump 141 substantially at its rated speed of 1750 RPM and is rated at 5 horsepower, with approximately 4½ horsepower driving the pump 141 and about ½ horsepower driving the rotating shower assembly 81.

Figure 2:
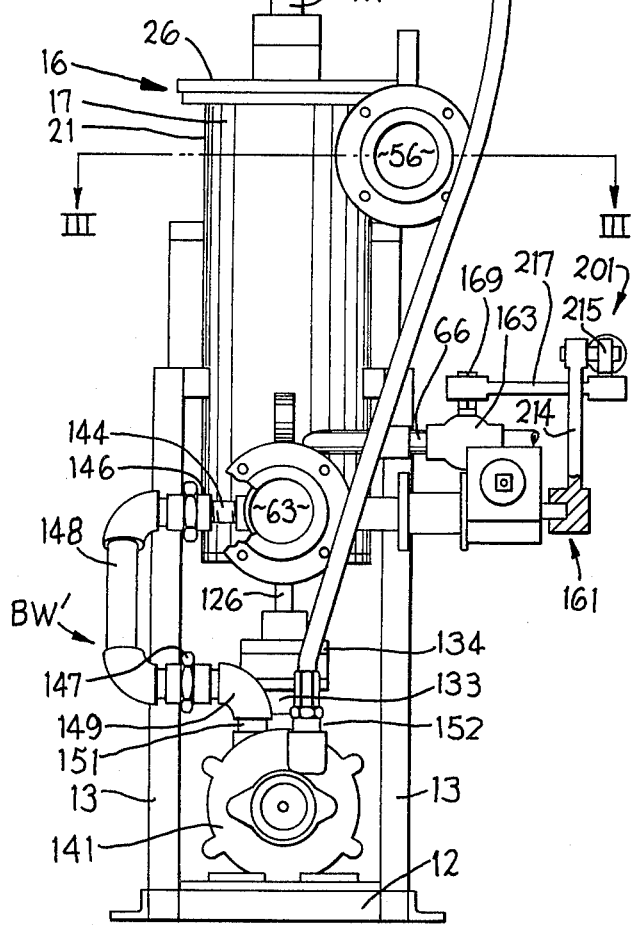
FIG. 2 is a left side view of the apparatus of FIG. 1.

As seen in FIGS. 1 and 2, backwash liquid is supplied to the pump 141 from a stub conduit 144 fixed to and extending radially from the filtrate outlet pipe 63, pipe couplings 146 and 147, an intervening pipe section 148 and an elbow 149. The outlet 152 of the pump here connects through a flexible high pressure hose 154 and a conventional quick release connector unit 156 to the inlet of the shower assembly 81 at the fitting 111 atop housing 17.

In the example shown, using nomimal 3-inch inlet and filtrate outlet pipes 56 and 63, the pump supplies about 26 GMP of filtrate to the shower assembly at a pressure of about 120 PSI above the filtrate outlet pressure. However, it is contemplated that backwash liquid flow rate and pressure may be varied, depending on the type of solids being filtered out, liquid inlet pressure, and other parameters, as desired, all within the broader confines of the present invention. For example, the pressure of liquid applied to the shower assembly may be selected from a range of about 30 to 200 PSI, with a corresponding variation in flow rate.

Figure 10A:
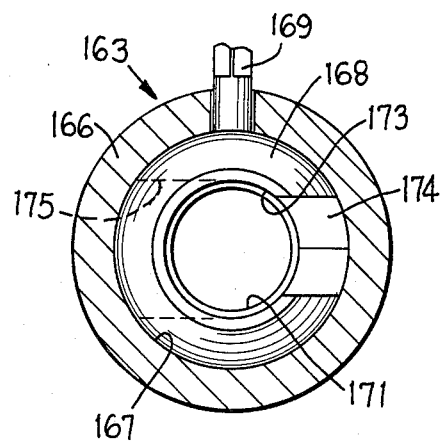
FIGS. 10A and 10B are axially facing cross-sectional views showing opposite positions of one of many possible solids outlet valves usable in the FIG. 1 apparatus.
Figure 10B:
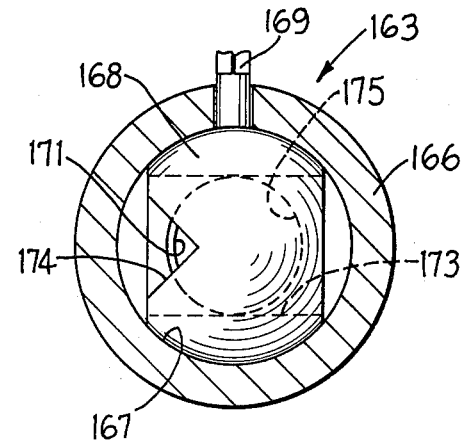

In the preferred embodiment shown, the removal of solids from the solids collection chamber 34 is controlled by a solids removal unit (FIGS. 1–3) generally indicated at 161. The solids removal unit includes a solid outlet valve 163 interposed in the solids outlet pipe 66 for controlling the rate of flow therethrough. The valve 163 may be a simple on-off valve, but in the preferred embodiment shown is shiftable between partially open and fully open positions. While the valve 163 may be implemented in different ways, FIGS. 10A and 10B show a preferred embodiment in the form of a ball valve. The valve 163 has a housing 166 containing a spherical central chamber 167 and split in a plane not shown to permit snugly sealed reception thereinto a valve ball 168 rotatable through a quarter-turn by corresponding rotation of its actuating shaft 169. A bore 171 through the valve housing 166 communicates coaxially with the solids outlet pipe 66 and passes through the spherical chamber 167 such that the rotated position of the valve ball 168 controls flow through the solids outlet pipe 166. A cross passage 173 through the valve ball 168 is alignable with the bore 171 to fully open the valve. A notch 174 and leg passage 175 in the ball communicate across the cross passage 173 and when aligned parallel to the axis of the valve housing bore 171 (with the cross passage 173 at right angles to the housing bore 171 and hence closed) permit a partial flow through the valve 163. Thus, the valve 163 is fully opened with the cross passage 173 coaxial with the housing bore 171 and is partially open with the ball rotated 90° to make the notch 174 and leg passage 175 parallel to the housing bore 171.

In its partially open position, the size of the notch 174 is selected to permit the desired fraction of the liquid flow into inlet pipe 56 to pass through the solids outlet pipe 66, the preferred range of fractions being from 1/10 to 1/20. This fraction can be increased by rotating the ball 168 to its open position such that a greater percentage of the inlet flow through pipe 56 exits through solids outlet pipe 66.

Normally the inlet and filtrate outlet pipes 56 and 63 will be similar in diameter and the solids outlet pipe 66 will be considerably smaller in diameter to help limit flow rate of liquid therethrough in the normal part open condition of the solids outlet valve hereafter described. Thus, in one example in which the pipes 56 and 63 were conventional three-inch piping, the solids outlet pipe 66 was conventional three-quarter inch pipe.

Figure 9:
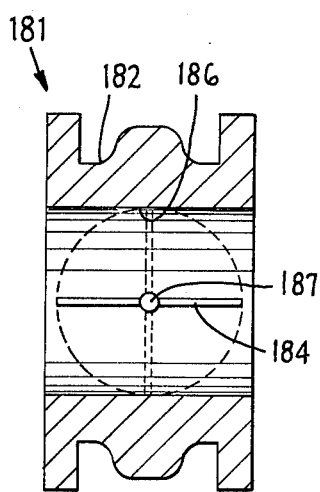
FIG. 9 is a radially facing cross-sectional view of a filtrate outlet valve usable in the FIG. 1 apparatus.

To permit all of the inlet flow to exit through the open solids outlet pipe 66, an on-off filtrate valve 181 is connected in series with the filtrate outlet pipe 63, as seen in FIG. 3. The filtrate valve may be of any conventional type and in the preferred embodiment shown is provided as a conventional butterfly valve generally indicated in FIG. 9. The butterfly valve 181 includes a valve housing 182 connectible (as through conventional flanges) in series with the filtrate outlet pipe 63 and provided with a butterfly plate 184 pivotable through 90° within a valve chamber 186 to open or close the path through the valve 181 in a conventional manner. The plate 184 is carried on and rotated by an actuating shaft 187 which extends out through a neck 188 (FIG. 3) of the housing 182 so as to be accessible for external opening and closing of the valve.

In normal operation, valve 163 is in its part-open position and valve 181 is in its full-open position as, a small portion (for example 1/20) of the liquid passing through the filter unit is used to withdraw solids from the solids collection chamber 134 and carry same away out through the solids outlet valve 163 while the major portion of the liquid input passes as filtrate out through the open valve 181. In normal operation, the concentration of solids in collection chamber 34 is permitted to reach a preselected value, substantially exceeding the solids concentration in the incoming liquid in pipe 56. The maximum desirable concentration, or threshold limit, for the space 34 will normally depend on the type of solids involved and could vary for example from 200 to 2,000 PPM. Under given operating conditions, the selection of a solids outlet valve 163 having an appropriately sized partial open position will permit continuous operation with continuous filtrate and solids outputs.

However, when solids concentration in the chamber 34 increases beyond the desired threshold value, which value normally corresponds to blinding of the filter to a predetermined extent and corresponding loss of filtering efficiency, it is then desirable to fully open the solids outlet valve momentarily and preferably also to close the filrate outlet valve so as to substantially increase the rate of solids removal from and the concentration of solids in the space 34 so that the shower assembly 81 can restore the filter to an unblinded high filtering efficiency condition. When this condition is reached, the valves 163 and 181 can be restored to their normal partly open and open conditions, respectively.

Operation of the valves 163 and 181 in the foregoing manner can be carried out manually. However, the present invention provides an automatic valve controller generally indicated at 201 in FIGS. 1, 3 and 11. Controller 201 includes a rotary valve actuator 202 having a rotary output shaft with ends 203 and 204. The rotary valve actuator 202 may be of any convenient type, for example a Model No. PA-50, manufactured by Raymond Control Systems of St. Charles, Ill.

The actuator 202 here includes a double-acting pressure fluid cylinder 206 having a piston 207 with an extension 208 in the form of a rack rotatably driving a pinion 209 fixed on and rotating the shaft 203, 204 (suitably supported by bearings not shown). A double-acting cylinder is preferred because it can more readily be made to switch a solids outlet valve ball which is stuck in position due to long exposure to high concentrations of sticky solids, whereas it may be impractical to equip a single-acting pressure fluid cylinder with a sufficiently strong return spring. The valve actuator 202 (FIG. 3) includes a housing 211 from which extends the pressure fluid cylinder 206 and an extension 212 fixed, as by bolting to the valve housing portion 187, and through which the shaft end 203 extends and connects in rotary driving relation to the valve shaft 187. The shaft end 204 of actuator 202 connects here through a linkage 213 to the shaft 169 of solids outlet valve 163. Linkage 213 here comprises a crank arm 214 fixed to and pivoted by shaft 204, a link 215 (FIGS. 1-3) connected through a ball joint 216 to the free end of a further lever 217 in turn fixed to and pivotally driving the solids valve shaft 169. In this way, actuator 202 normally holds valves 181 and 163 in their open and part-open positions, respectively, and is actuable in response to a pressure fluid input for closing valve 181 and fully opening valve 163.

Figure 3A:
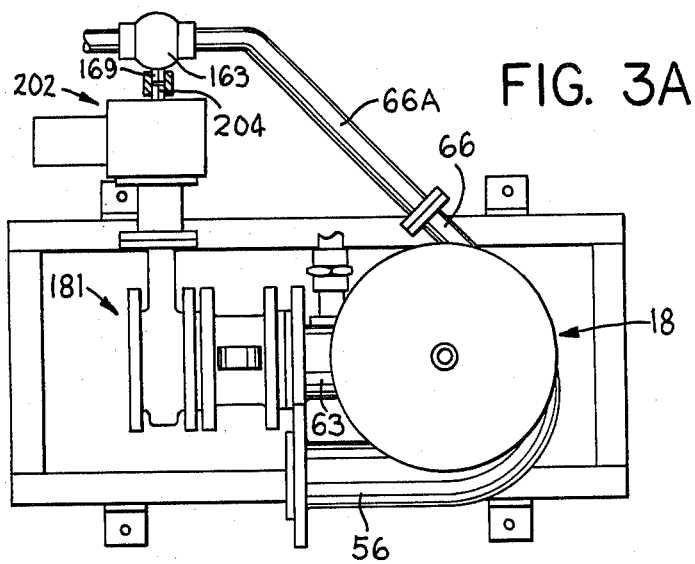
FIG. 3A is a view similar to FIG. 3 but showing a modification.

Alternatively, the linkage 213 may be eliminated and the apparatus made more compact by circumferentially relocating the solids outlet pipe 66 about 120° to 150° clockwise from its FIG. 3 position, as generally indicated by the line 66A in FIG. 3A, by rotation of the valve actuator 202 through 180° about the axis of the filtrate outlet pipe 63 (so as to extend leftward rather than rightward therefrom in FIG. 2), and by connecting the solids outlet valve 163 to the solids outlet pipe 66 through a flexible portion or elbow member. With the actuator shaft 204 and solids outlet valve shaft 169 thus, adjacent and coaxial, same can be directly connected through a simple coupling rather than through the linkage 213.

Pressure sensors 231 and 232 are connected to inlet pipe 56 and filtrate outlet pipe 63 by any convenient means, here by conventional bolted flange connections. The filtrate pressure sensor 232 is interposed between and interconnects the housing of the filtrate valve 181 to the end of the filtrate outlet pipe 63. The pressure sensors 231 and 232 here shown are pressure instrument protector devices, preferably of the type shown in U.S. Pat. No. 3,563,095, assigned to the assignee of the present invention. Pressure gauges 234 and 235 visually display the inlet and filtrate outlet pressures at sensors 231 and 232, respectively.

As seen in FIG. 1, a conventional differential pressure switch 238 (for example, Model No. 17R3-K5 made by Static-O-Ring, Inc. of Olathe, KS., has inputs responsive to the pressures sensed by sensors 231 and 232 to which it is connected by conduits schematically indicated by the broken lines 241 and 242, respectively. When the inlet pressure at sensor 231 exceeds the filtrate outlet pressure at sensor 232 by more than a preselected pressure differential (or threshold value), the differential pressure switch closes and thereby applies a signal (as schematically indicated by broken lines 243 in FIG. 1) to a control circuit 244 which in turn actuates the pressure fluid cylinder 206 of valve actuator 202 to fully open the solids outlet valve 163 and close the filtrate outlet valve 181, as above described.

Figure 11A:
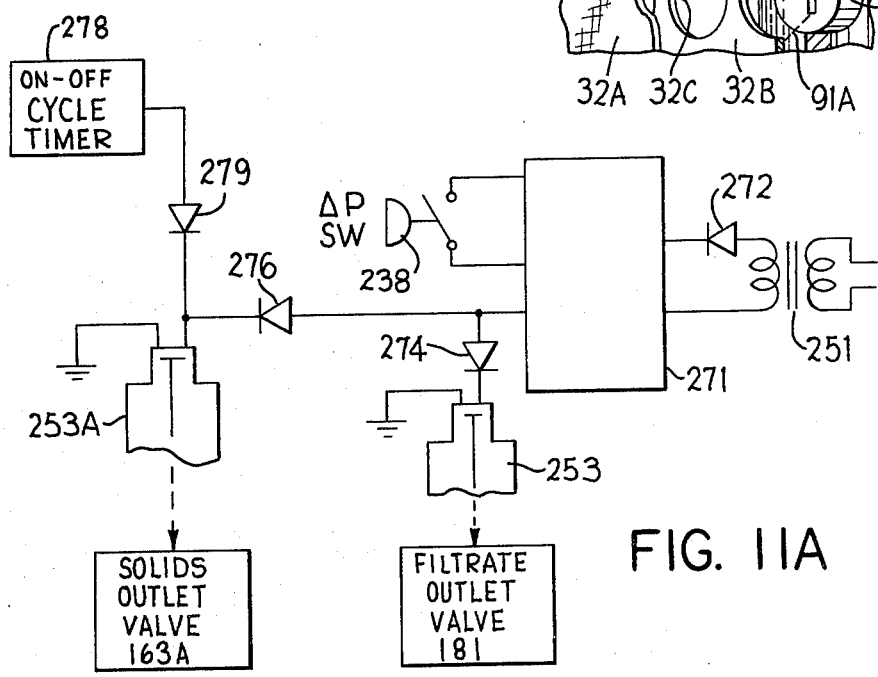
FIG. 11A is a simplified schematic diagram similar to FIG. 11 but showing a modification.
Figure 11:
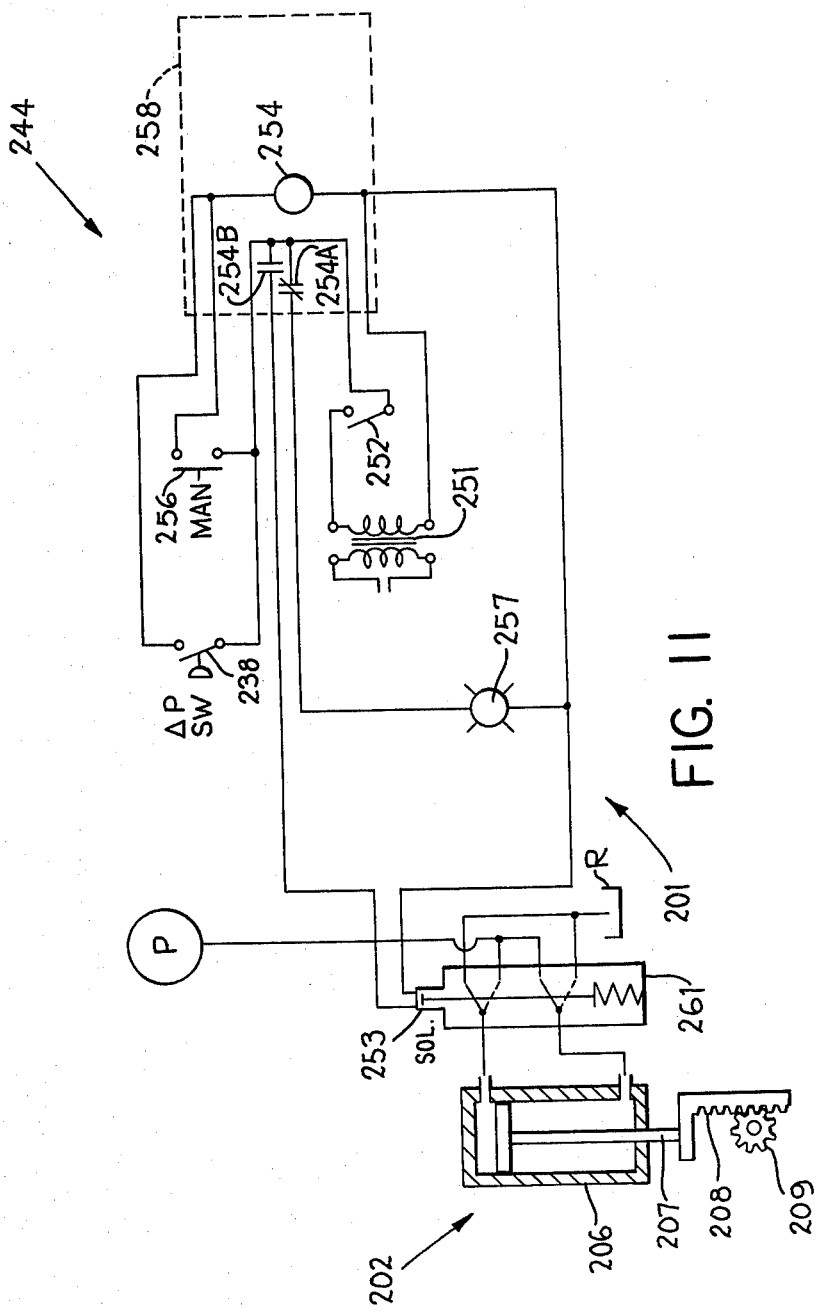
FIG. 11 is a schematic diagram illustrating an electrical and pneumatic circuit for opening the solids outlet valve of the apparatus of FIG. 1.

FIG. 11 schematically discloses a suitable control circuit 244. Circuit 244 includes a power transformer 251 connected to a voltage supply, such as 120 volts, 60 Hz AC. The secondary winding of transformer 251 has a common side and its other side connects in series with a main power switch 252. Connected in series across the transformer 251 and main switch 252 is a conventional time delay relay coil 254 in series with the differential pressure switch 258. A manual start switch 256 may parallel the differential pressure switch 238 to test the apparatus controlled by the differential pressure switch. An on-stream light 257 may connect in series with a normally closed contact 254A of the time delay relay 254, across the transformer 251 and main switch 252 to indicate normal operation of the apparatus. A valve solenoid 253 and a normally open contact 254B of the time delay relay 254 connect in series across the transformer 251 and main switch 252. The interconnection between the foregoing circuit elements are here shown to be within a block 258 which may take the form of a programmer circuit providing additional features for testing and operation, for example, suitable further time delay or hysteresis means which delay actuation or deactuation of the solenoid 253 when the pressure switch closes, or reopens, so as to cause the valves 181 and 163 to change state other than when the differential pressure switch opens or closes.

However, in the FIG. 11 embodiment, closure of the differential pressure switch 238 actuates the time delay relay coil 254 causing same to open contact 254A and shut off light 257 and to close contact 254B and thereby energize the solenoid 253 6o shift a solenoid valve 261 from its position shown in the drawing. Such shifting of the solenoid valve 261 causes pressure fluid from source P to extend the piston rod 207 of the pressure fluid cylinder 206. When the differential pressure switch 238 opens, the time delay relay 254 begins timing a delay interval of preselected duration. The time delay relay 254 is set to time out a preselected period of time after the pressure differential sensed by switch 238 falls below its threshold value. Relay 254 then resets contacts 254A and 254B to their normal FIG. 11 positions. This reenergizes light 257 and deenergizes the solenoid 53 of valve 261 which spring returns to its normal FIG. 11 position, reversing the connections of the pressure fluid cylinder to the pressure fluid source P and return reservoir R and thereby returning the piston rod 207 to its FIG. 11 position.

OPERATION

To briefly summarize the operation of the disclosed apparatus, in normal operation liquid to be filtered passes from source PL through inlet pipe 56 and extension 61 tangentially into the annular space 34 near the upper end thereof, and imparts a circumferential motion (counterclockwise in FIG. 3) to the liquid in space 34. Liquid, freed of solids by the peripheral wall 32 of the filter element 31, passes down through the central portion of the filter element, through the holes 43 and outlet chamber 46 and thence out through outlet pipe 63 and normally open filtrate valve 181 to a desired point of use U. Solids entering the space 34 cannot penetrate the peripheral wall 32 of the filter element and so impinge on the peripheral wall 32 or circulate around the filter element and gradually fall to the bottom of the space 34. The normal partially open position of the solids outlet valve 63 permits liquid, entraining the resulting high concentration of solids at the bottom of the space 34, to exit through the solids outlet pipe 66 at a normal flow rate which is a small fraction of the inlet flow rate in inlet pipe 56.

Should the concentration of solids in the space 34 for any reason build up beyond a permitted value, tending to blind or partially blind the filter element and thereby impede normal filter operation, the differential pressure switch 238 senses an increase in the normal pressure drop across the filter element (namely an increase in the difference between the liquid pressures in inlet 56 and filtrate outlet 63) beyond a preselected threshold value. The differential pressure switch 238 then switches to its abnormal state and causes the control 244 to fully open valve 163 and close valve 181, so as to direct the entire inlet flow from pipe 56 out through solids outlet pipe 66. This substantially reduces the concentration of solids in the space 34 to an acceptable level.

When the pressure differential sensed by switch 238 falls below its threshold value, the switch returns to its normal state, causing the control 234 to return the valves 163 and 181 to their normal part-open and full-open positions, respectively, after the time delay determined by the relay 254 of programmer 258. Thus, the apparatus resumes normal continuous filtering with continuous elimination of solids from chamber 34 by the fractional flow through solids outlet pipe 66.

Throughout the foregoing normal and excessive solids operating modes, the shower assembly 81 continuously rotates and forces backwash liquid reversely through the filter element peripheral wall. This knocks caked or clinging solids off the outer surface of wall 32 into close suspension in the solids collection space 34 for removal through the pipe 66 as above described. The backwash liquid pressure at the jets 91 may be set higher for particularly difficult solids material, for example, fibrous solids which tend to interlock with the filter mesh and/or sticky particles which tend to stick to each other and to the wall of the filter element.

Rotation of the shower assembly 81 in the same circumferential direction as the incoming flow through extension 59 tends to further assist the spiral circulation of entrained solids in the space 34.

The swirling motion in the space 34 resulting from the tangential direction of the inlet pipe, the tangential direction of the solids outlet pipe and even the direction of orbiting of the jets, develops a centrifugal force which tends to throw the solids to the radially outer part of the space 34 to keep same away from, and off, the filter element. This reduces the tendency of solids to migrate radially inward toward the filter element peripheral wall, both as to incoming new solids and also as to solids which have been knocked off the filter element peripheral wall by the orbiting jets of the shower assembly 81.

MODIFICATION

The invention as described above continuously removes solids through a normally partially open solids outlet valve 163, which fully opens only when excessive solids build-up within the housing 17 actuates the differential pressure switch 238. However, the solids outlet valve 163 may instead be a conventional on-off ball valve (without the notch 174 and passage 175 of FIGS. 10A and 10B), which is normally fully closed and is periodically switched to its open condition for intermittent removal of solids from the space 34. The relation between the open and closed times of the on-off type solids outlet valve is controlled so that the average flow therethrough is in the same range (for example 1/10 to 1/20 of the flow into the inlet pipe) as for the FIG. 10A and 10B valve.

FIG. 11A shows an exemplary circuit similar to FIG. 11 but modified for such intermittent solids removal and with most of the FIG. 11 circuitry enclosed within the box 271. For convenience, the circuit is DC operated, by addition of a rectifier 272 in series with the power transformer 251 of FIG. 11. The "common" line in FIG. 11 corresponds to the "ground" symbol in FIG. 11A.

In FIG. 11A, solenoid 253 is driven through an isolating diode 274 and controls only the filtrate outlet valve, all mechanical interconnection between the outlet valves 163 and 181 being eliminated. A further solenoid 253A actuates only the solids outlet valve 163 through a solenoid valve and pressure fluid cylinder actuator (not shown) in a manner similar to but entirely independent from the driving of the filtrate valve 181 by solenoid 253 through valve 261 and pressure fluid cylinder 206. A further isolating diode 276 connects the solenoid 253A in parallel with the diode 274 and solenoid 253. Accordingly, closure of the differential pressure switch 238 actuates both solenoids 253 and 253A to fully open the valve 163 and close the valve 181 in the manner above described with respect to FIGS. 1-11.

FIG. 11A also includes a conventional cycle timer 278, for example a conventional timing motor operating a switch in a DC line or an electronic timing circuit, which periodically energizes a further isolating diode 279, to momentarily open the solids outlet valve 163A.

Thus, in normal operation, the on-off solids outlet valve is periodically opened from its normal closed condition by the cycle timer 278. However, the solids outlet valve 163A can also be opened by closure of the differential pressure switch 238, regardless of the condition of the cycle timer 278.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a self-cleaning filter assembly, for removing solids from incoming liquid to be filtered, of the kind including
   a housing;
   a cylindrical filter element within said housing;
   inlet means for introducing said liquid to be filtered under pressure into said housing externally of said filter element;
   filtrate outlet means communicating with the inside of said filter element for withdrawing filtered liquid from said housing; and
   solids outlet means for withdrawing solids from said housing, wherein the improvement comprises:
   means fixedly mounting said filter element substantially coaxially within said housing, with an annular solids collection space between the peripheral walls of said filter element and housing, said solids collection space being connected with said solids outlet means;
   a shower assembly rotatable coaxially within said filter element, said shower assembly including jet means distributed axially therealong, said jet means being aimed outward toward the inner surface of said filter element;
   means for rotating said shower assembly;
   means supplying a backwash liquid to said shower assembly under pressure exceeding said pressure of said liquid to be filtered for continuously pushing solids off the outer surface of said filter element in circumferentially advancing fashion around the interior of said housing;
   said housing comprising a removable top plate closing the upper end thereof and pendently supporting said filter element within said housing, said top plate defining one end wall of said housing, one end of said shower assembly extending coaxially upward through a central opening in said top plate and having an annular flange releasably fixed thereon, said top plate fixedly carrying an inner sleeve engaging said shower assembly end with liquid seal and radial thrust bearing means and supporting said annular flange of said shower assembly on axial thrust bearing means, a cup member loosely surrounding said inner sleeve and annular flange and the adjacent end of said shower assembly, said cup member being removably affixed to the upper face of said top plate, said upper shower assembly end including a backwash liquid passage communicating between the interior of said cup member and said jet means in said eccentric portion, said cup member including means connectible to a supply of backwash liquid under pressure, said housing including a bottom plate closing the bottom end thereof and defining the other end wall of said housing, said bottom plate carrying seal means and radial thrust bearing means through which the drive end of said shower assembly protrudes from said housing for connection to said means for rotating said shower assembly, said top plate, filter element and shower assembly being removable as a unit from said housing upon release of said top plate from the upper end of the peripheral wall of said housing.

2. The apparatus of claim 1 in which said shower assembly is removable from within said filter element upon detachment of said filter element from said top plate and is releasable from said top plate through disconnection of said cup member from said top plate and release of said annular flange.

3. A self-cleaning filter assembly for removing solids from an incoming liquid to be filtered, of the kind including
   a housing;
   a cylindrical filter element within said housing;
   inlet means for introducing said liquid to be filtered under pressure into said housing on one side of said filter element;
   filtrate outlet means communicating with the other side of said filter element for withdrawing filtered liquid from said housing, and solids outlet means for withdrawing solids from said housing, wherein the improvement comprises:

means mounting said filter element within said housing adjacent said inlet means and with a solids collection space between said inlet means and the filtering surface of said filter element and connected with said solids outlet means;

backwash means for backwashing said filter and thereby for moving solids from the filtering surface of said filter element into said solids collection space;

said solids outlet means including a solids outlet valve adjustable between a normal operating position and an open position; and control means responsive to a preselected drop in liquid pressure at said filtrate outlet means with respect to the liquid pressure at said inlet means indicative of an excessive increase in solids concentration in said solids collection space for shifting said solids outlet valve to its open position and thereby for reducing such solids concentration by venting said solids collection space through said solids outlet valve at a high flow rate.

4. The apparatus of claim 3 in which said control means includes a pressure differential switch means responsive to a difference in liquid pressure between said inlet means and filtrate outlet means exceeding a preselected threshold pressure for changing state, said control means further including valve actuator means responsive to said changing of state of said pressure differential switch means for shifting said solids outlet valve to its open position.

5. The apparatus of claim 4 in which said filtrate outlet means includes a filtrate outlet valve having a normally open position and a closed position, said valve actuator means including a portion responsive to said pressure differential switch means state change for also shifting said filtrate outlet valve to its closed position in concert with shifting of said solids outlet valve to its open position such that liquid leaving said housing must do so through said solids outlet means.

6. The apparatus of claim 3 in which said normal position of said solids outlet valve is a partly open position preselectable for providing a flow rate therethrough in the range of about 1/10 to 1/20 of the flow rate into said inlet means.

7. The apparatus of claim 3 in which said normal position of said solids outlet valve is closed, and timing means for periodically opening said solids outlet valve to discharge solids from said solids collection space on an intermittent basis, such that said solids outlet valve is openable both by said timing means in a normal timed manner and by said control means in response to an excessive increase in solids concentration in the solids collection space.

8. The apparatus of claim 5 in which said valve actuator means comprises a pressure fluid cylinder and a shaft means bidirectionally rotatable in response to bidirectional reciprocation of said pressure fluid cylinder, said filtrate outlet valve comprising a butterfly valve connected for rotation with said shaft means, said valve actuator being mounted on said filtrate outlet means, said solids outlet valve comprising a rotatable ball valve, and including means connecting said shaft means to said ball valve, such that actuation of said pressure fluid cylinder simultaneously effects opening rotation of said solids outlet valve and closing rotation of said filtrate outlet valve.

9. The apparatus of claim 6 in which said solids outlet valve is a ball valve comprising a ball rotatable through a quarter turn in a valve housing, the valve housing having a bore communicating coaxially with a solids outlet pipe constituting a part of said solids outlet means, said bore communicating with a spherical chamber in said valve housing, said ball being snugly rotatable in said spherical chamber, said ball having a cross passage alignable with said bore to fully open said solids outlet valve, said ball having a leg passage crossing said cross passage substantially at right angles thereto, said leg passage including a substantially reduced cross section formed by a notch in the ball, said cross passage and leg passage lying in the plane of rotation of the ball such that said leg passage with its notch is alignable with said bore in said housing to provide said partly open position of said solids outlet valve.

10. The apparatus of claim 6 in which said inlet means, filtrate outlet means and solid outlet means respectively include an inlet pipe, filtrate outlet pipe and solids outlet pipe, said inlet and filtrate outlet pipes being substantially similar in diameter, said solids outlet pipe having a diameter of approximately one-fourth that of said inlet and filtrate outlet pipes, so as to help limit flow rate of liquid through said solids outlet pipe in said partly open position of said solids outlet valve.

11. The apparatus of claim 8 in which said pressure fluid cylinder is a double acting pressure fluid cylinder having a piston extension in the form of a rack rotatably driving a pinion driving said shaft means, said means connecting said shaft means to said ball valve constituting linkage means comprising a crank arm fixed to and pivoted by said shaft means, a link connected through a ball joint to the free end of a further lever in turn fixed to and pivotally driving a shaft of the solids outlet valve, said filtrate outlet valve having a shaft connecting substantially coaxially with shaft means rotatably driven by said rack, said solids outlet means as seen from above comprising a pipe extending substantially at right angles to a filtrate outlet pipe constituting a portion of said filtrate outlet means, said shaft means of said actuator means extending substantially perpendicular from said filtrate outlet pipe and substantially parallel to and side-by-side with said solids outlet pipe.

12. The apparatus of claim 8 in which said filtrate outlet means includes a filtrate outlet pipe carrying said filtrate outlet valve, said shaft means of said valve actuator extending substantially at right angles to said filtrate outlet pipe from said filtrate outlet valve, said solids outlet means comprising a solids outlet pipe extending at an angle divergent from said filtrate outlet pipe to the side of said valve actuator means opposite said filtrate outlet valve for connection of said solids outlet valve to said shaft mens of said valve actuator on the side thereof opposite said filtrate outlet valve.

13. A self-cleaning filter assembly, for removing solids from incoming liquid to be filtered, of the kind including a housing;

a cylindrical filter element within said housing and spaced inward from the peripheral wall of said housing by an annular solids collection space, said housing filter and space having a substantially vertical axis;

inlet means for introducing the liquid to be filtered under pressure into said housing externally of said filter elemnt;

a shower assembly rotated coaxially within said filter element, said shower assembly having jet means for expelling backwash liquid outward through the peripheral wall of said filter element to dislodge solids collected on said filter element peripheral wall into said annular solids collection space;

a filtrate outlet means communicating with the inside of said filter element at the lower end of said housing for withdrawing filtered liquid from said housing; and solids outlet means through the bottom end of said solids collection space;

wherein the improvement is comprised by said inlet means being an inlet pipe extending substantially tangentially of said housing to near the top end of said housing and then curving in a decreasing radius spiral about the axis of said housing to communicate radially with said space over a substantial fraction of the circumference of said housing so as to direct liquid spiraling inward toward said filter element in one circumferential direction, said rotation of said shower assembly being in the same circumferential direction as said inlet liquid flow, said solids outlet means comprising a solids outlet pipe extending tangentially from said solids collection space in the same circumferential direction as said liquid inlet flow and shower assembly rotation;

whereby said circumferentially elongate, inward spiraling inlet pipe, shower assembly rotation and outlet pipe direction all tend to contribute to a centrifugal movement of solids away from the face of the filter element.

14. The apparatus of claim 13 including wall means extending between the interior surface of the peripheral wall of said housing and the lower end of said filter element for closing the bottom end of said annular space, said solids outlet pipe communicating with said annular space near the bottom thereof, such that solids remaining in the liquid outside the filter element tend to increase the concentration at the bottom of said annular space due to gravity and the downward flow from the inlet means to the solids and filtrate outlet means, and such that circumferential motion of liquid in said annular space induced by forcing of liqud thereinto from said inlet means assists in driving concentrated solids tangentially out of said annular space through said solids outlet pipe.

15. The apparatus of claim 13 in which said housing extends below said filter element and annular space to form an outlet chamber, said outlet chamber being open to the interior of said filter element and closed to said annular space, said filtrate outlet means comprising a filtrate outlet pipe extending partially into said outlet chamber in a substantially radial direction.

16. The apparatus of claim 13 in which said shower assembly has a backwash liquid inlet end and an opposite rotatably driven end both coaxial with said filter element and extending out of said housing through axially opposite end walls of said housing in liquid sealed, rotatably supported relation thereon, a frame supporting said housing, a motor supported on said frame, a high pressure pump supported on said frame and connected between said filtrate outlet means and the backwash inlet end of said shower means, said pump having an outlet pressure exceeding the pressure at said inlet means and filtrate outlet means, and rotational speed and direction changing means connecting said motor to said pump and to the rotationally driven end of said shower assembly for effecting relatively low speed rotation of said shower assembly and relatively high speed rotation of said pump.

17. The apparatus of claim 16 in which said filter element comprises a perforate end wall for passing filtrate liquid from the interior of said filter element, said perforate end wall including central guide means for axially receiving one end of said shower assembly therethrough during assembly of the apparatus.

18. The apparatus of claim 13 with said shower assembly extending substantially the full axial length of said filter element and having means delivering backwash liquid substantially in a sheet extending the full axial height of the filter element and against the interior wall of the filter element to peel solids from the exterior of the filter element in an axially extending and circumferentially advancing line, said line advancing in the same circumferential direction as said inlet liquid flow and solids outlet flow.

19. The apparatus of claim 18 in which said inlet pipe communicates through the housing peripheral wall over about one-quarter of the circumference of the latter.

20. In a self-cleaning filter assembly, for removing solids from incoming liquid to be filtered, of the kind including a housing;

a cylindrical filter element within said housing;

inlet means for introducing said liquid to be filtered under pressure into said housing on the inlet side of said filter element;

filtrate outlet means communicating with the outlet side of said filter element for withdrawing filtered liquid from said housing; and solids outlet means for withdrawing solids from said housing, wherein the improvement comprises:

means mounting said filter element substantially coaxially within said housing, with a solids collection space connected with said solids outlet means;

a shower assembly disposed coaxially of said filter element, said shower assembly including an eccentric portion having closespaced jets distributed axially therealong in a substantially linear array extending substantially the effective length of said filter element, said jets being aimed toward and lying close to the surface of the filtrate outlet side of said filter element for orbiting with respect thereto, said filter element comprising a filtering surface backed by a rigid backing shell perforated by axially closespaced circumferential rows of holes, each said jet facing outward toward its own said circumferential row of holes to orbit into substantially coaxial alignment with successive holes of its corresponding circumferential row, the spray pattern of each jet being of vertical extent to occupy substantially the full vertical diameter of successively presented holes of its corresponding circumferential row so as to maximize the amount of backwash spray from each jet which passes through each hole to said filtering surface;

means operatively interposed between said shower assembly and filter element for relatively rotating same;

means supplying a backwash liquid simultaneously to said jets of said array extending substantially the effective length of said filter element, under pressure exceeding said pressure of said liquid to be filtered for continuously pushing solids off the inlet surface of said filter element in circumferentially advancing fashion.

21. The apparatus of claim 20 in which said shower assembly comprises a central pipe member disposed within said filter element and rotatably supported on the upper end and lower ends of said housing, said means for rotating being actuable to continuously rotate said eccentric portion at a constant speed, said eccentric portion comprising and eccentrically located pipe member parallel to and radially spaced from said central pipe member by first and second substantially radially extending connecting pipe members, said jets being arranged axially on the radially outermost portion of said eccentrically located pipe member and facing radially outward toward said backing shell of said filter element, said eccentrically located pipe member having cleanout plugs normally closing the ends thereof but removable for inspection and/or cleaning of the interior ends of said jets.

22. The apparatus of claim 21 in which said jets are spaced at about 0.060 inch from the opposed wall of the filter element and each have an opening in the range of 0.018 to 0.040 inch, said shower assembly being pivoted rotationally at a speed in the range of 10 to 200 rpm, the pressure of the liquid applied to the shower assembly lying in the range of about 30 to 200 PSI.

23. The apparatus of claim 4, in which said control means includes a time delay means in series with said pressure differential switch across a voltage source such that switching to one state by the pressure differential switch actuates said time delay means, said time delay means including a portion connected to said valve actuator and responsive to actuation of said time delay means for opening said solids outlet valve and thereby venting solids through said solids outlet valve at a high flow rate such that said differential pressure switch eventually opens, said time delay means being responsive to switching to the other state by said differential pressure switch for timing a delay interval of preselected duration, after which said time delay means causes said valve actuator to return said solids outlet valve to its normal operating position.

24. The apparatus of claim 13 in which said solids outlet means includes a solids outlet valve adjustable between a normal operating position and an open position, and control means responsive to a preselected drop in liquid pressure at said filtrate outlet means with respect to the liquid pressure at said inlet means indicative of an excessive increase in solids concentration in said housing outside said filter element for shifting said solids outlet valve to its open position and thereby for reducing such solids concentration by venting said annular solids collection space through said solids outlet valve at a high flow rate.

* * * * *